US012355192B2

(12) United States Patent
Miyamoto

(10) Patent No.: US 12,355,192 B2
(45) Date of Patent: Jul. 8, 2025

(54) CONNECTOR UNIT

(71) Applicant: SUMITOMO WIRING SYSTEMS, LTD., Yokkaichi (JP)

(72) Inventor: Takeru Miyamoto, Yokkaichi (JP)

(73) Assignee: SUMITOMO WIRING SYSTEMS, LTD., Yokkaichi (JP)

( * ) Notice: Subject to any disclaimer, the term of this patent is extended or adjusted under 35 U.S.C. 154(b) by 309 days.

(21) Appl. No.: 18/252,888

(22) PCT Filed: Nov. 16, 2021

(86) PCT No.: PCT/JP2021/041987

§ 371 (c)(1),
(2) Date: May 15, 2023

(87) PCT Pub. No.: WO2022/107738

PCT Pub. Date: May 27, 2022

(65) Prior Publication Data

US 2023/0420889 A1 Dec. 28, 2023

(30) Foreign Application Priority Data

Nov. 20, 2020 (JP) ................................ 2020-193484

(51) Int. Cl.
*H01R 13/6581* (2011.01)
*H01R 13/405* (2006.01)

(52) U.S. Cl.
CPC ....... *H01R 13/6581* (2013.01); *H01R 13/405* (2013.01)

(58) Field of Classification Search
None
See application file for complete search history.

(56) References Cited

U.S. PATENT DOCUMENTS 8,827,747 B2 * 9/2014 Tanaka ............... H01R 13/6593 439/607.41
2016/0190712 A1 6/2016 Hirooka et al.
2016/0380390 A1 12/2016 Kusamaki et al.
2018/0219327 A1 8/2018 Hirooka et al.

FOREIGN PATENT DOCUMENTS

JP 2015207399 A 11/2015
WO WO-2016181822 A1 * 11/2016 ............. B60R 16/02

* cited by examiner

*Primary Examiner* — Tho D Ta

(57) ABSTRACT

An electromagnetic shield member according to one aspect of the present disclosure has an end portion fixed by being sandwiched between a bracket body serving as a first plate and a second fixing plate serving as a second plate. The bracket body has first positioning holes penetrating the bracket body in the plate thickness direction thereof. The second fixing plate has an end portion provided with first cutaway portions. Each of the first positioning holes and each of the first cutaway portions are formed such that the width of the first positioning hole and the width of the first cutaway portion are equal to each other in a first direction. Further, a part of the first positioning hole and a part of the electromagnetic shield member are positioned in the area of the first cutaway portion when viewed from the plate thickness direction of the second fixing plate.

6 Claims, 5 Drawing Sheets

CONNECTOR UNIT

BACKGROUND

Field of the Disclosure

The present disclosure relates to a connector unit.

Related Art

Japanese Laid-Open Patent Publication No. 2015-57758 discloses an example of a connector unit that is used for a vehicle and the like. The connector unit includes a connector, a plurality of electric wires extending from the connector, and an electromagnetic shield member covering the electric wires. The electromagnetic shield member includes a sheet of a conductor. The electromagnetic shield member is disposed at a side of the electric wires. A fixing member, which is formed of a conductor, is fixed to an end of the electromagnetic shield member. The fixing member is connected to a conductive member configured to be connected to the electromagnetic shield member.

In the connector unit described above, the electromagnetic shield member limits, for example, radiation of electromagnetic waves from the electric wires to the outside.

In a structure for fixing the fixing member to the electromagnetic shield member, the fixing member may include two plates that sandwich an end of the electromagnetic shield member to fix the electromagnetic shield member. In this case, in the task of fixing the two plates to the electromagnetic shield member, it is difficult to adjust the position of the electromagnetic shield member disposed between the two plates.

It is an objective of the present disclosure to provide a connector unit that facilitates the positional adjustment of an electromagnetic shield member.

SUMMARY

A connector unit according to the present disclosure includes a connector, electric wires extending from the connector, an electromagnetic shield member disposed at a side of the electric wires and formed of a sheet of a conductor, and a fixing member fixed to one end of the electromagnetic shield member. The fixing member includes a first plate and a second plate. The first plate and the second plate overlap in a thickness-wise direction of the first plate and the second plate. One end of the electromagnetic shield member is fixed by being sandwiched between the first plate and the second plate. The first plate includes a positioning hole used for positioning. The positioning hole extends through the first plate in the thickness-wise direction of the first plate. The second plate includes a cutaway portion in an end of the second plate. The positioning hole is equal in width to the cutaway portion. As viewed in the thickness-wise direction of the second plate, entirety or part of the positioning hole and part of the electromagnetic shield member are located in a region of the cutaway portion.

The present disclosure provides a connector unit that facilitates the positional adjustment of an electromagnetic shield member.

DETAILED DESCRIPTION

Description of Embodiments of Present Disclosure

Figure 1:
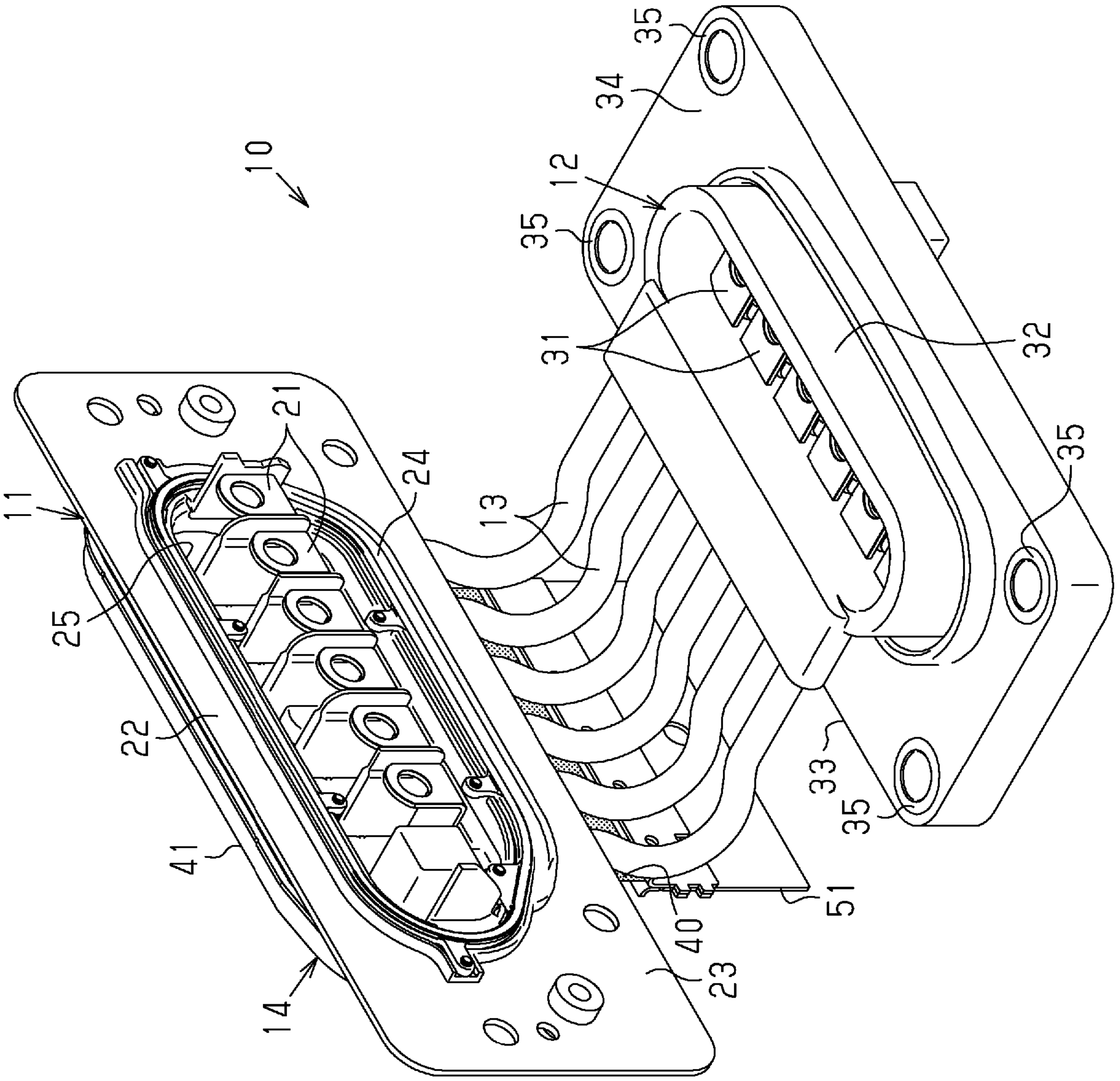
FIG. 1 is a perspective view showing an embodiment of a connector unit.

The embodiments of the present disclosure will now be described.

A connector unit according to the present disclosure includes

[1] a connector, electric wires extending from the connector, an electromagnetic shield member disposed at a side of the electric wires and formed of a sheet of a conductor, and a fixing member fixed to one end of the electromagnetic shield member. The fixing member includes a first plate and a second plate. The first plate and the second plate overlap in a thickness-wise direction of the first plate and the second plate. One end of the electromagnetic shield member is fixed by being sandwiched between the first plate and the second plate. The first plate includes a positioning hole used for positioning. The positioning hole extends through the first plate in the thickness-wise direction of the first plate. The second plate includes a cutaway portion in an end of the second plate. The positioning hole is equal in width to the cutaway portion. As viewed in the thickness-wise direction of the second plate, entirety or part of the positioning hole and part of the electromagnetic shield member are located in a region of the cutaway portion.

With this structure, when coupling the fixing member to the electromagnetic shield member, the positioning hole of the first plate overlaps the cutaway portion of the second plate. Thus, the second plate is positioned with respect to the first plate. In addition, when the electromagnetic shield member is sandwiched between the first plate and the second plate, the cutaway portion allows for visually recognition that the edge of the electromagnetic shield member is located near the end of the second plate provided with the cutaway portion. Thus, as the electromagnetic shield member is seen through the cutaway portion, the position of the electromagnetic shield member is adjusted. This facilitates the positional adjustment of the electromagnetic shield member. Accordingly, the efficiency of the task of fixing the fixing member and the electromagnetic shield member is improved.

[2] The positioning hole is one of a plurality of positioning holes arranged next to each other in a first direction that is orthogonal to the thickness-wise direction of the first plate, and the cutaway portion is one of a plurality of cutaway portions arranged next to each other in the first direction in correspondence with the positioning holes.

With this structure, when coupling the fixing member to the electromagnetic shield member, the positioning hole of the first plate overlaps the cutaway portion of the second plate. Thus, the second plate is further appropriately positioned with respect to the first plate.

[3] The cutaway portion is referred to as a first cutaway portion, the second plate includes a second cutaway portion disposed in an end of the second plate in the first direction, the first plate includes a positioning portion including a hole or a cutaway portion that overlaps the second cutaway portion in the thickness-wise direction, and the second cutaway portion is equal in width to the positioning portion in a second direction that is orthogonal to the thickness-wise direction of the first plate and the first direction.

With this structure, when coupling the fixing member to the electromagnetic shield member, the positioning portion of the first plate overlaps the second cutaway portion of the second plate. Thus, the second plate is positioned with respect to the first plate in the first direction and the second direction.

[4] The connector includes a first connector and a second connector, the electric wires electrically connect the first connector and the second connector, the fixing member includes an electromagnetic shield cover that is fixed to one end of the electromagnetic shield member, the fixing member includes a bracket that is fixed to the other end of the electromagnetic shield member, the electromagnetic shield cover and the bracket are each formed of a conductor, the electromagnetic shield cover is fixed to the first connector in a manner covering the first connector, and the bracket is separated from the second connector and non-integrated with the second connector.

With this structure, one end of the electromagnetic shield member is sandwiched and fixed between the first plate and the second plate of the electromagnetic shield cover. This allows the fixing of the electromagnetic shield member to the electromagnetic shield cover without forming an opening in the electromagnetic shield cover. In addition, the bracket, which is fixed to the other end of the electromagnetic shield member, is separated from the second connector. This allows the bracket to be grounded by, for example, being coupled to the casing of an on-board device.

[5] The second plate of the electromagnetic shield cover and the second plate of the bracket are identical in shape.

In this structure, the second plate of the electromagnetic shield cover and the second plate of the bracket are identically-shaped components. This simplifies the handling of the components of the connector unit.

[6] The second connector includes a terminal connected to the electric wires, a holder that holds the terminal and is formed from a synthetic resin, and a terminal mount coupled to an on-board device and is formed of a synthetic resin.

This structure reduces the weight of the connector unit as compared to a structure in which the terminal mount is formed from metal. In this structure, since the bracket is separated from the second connector, the terminal mount of the second connector is not used for grounding the bracket. This eliminates the need for forming the terminal mount of a conductor and thus increases the degree of freedom for selecting the material of the terminal mount.

DETAILED DESCRIPTION OF EMBODIMENTS OF PRESENT DISCLOSURE

Specific examples of a connector unit according to the present disclosure will be described below with reference to the drawings. In the drawings, components may be partially exaggerated or simplified to facilitate understanding. The dimensional ratio of the components may differ between the drawings. In this specification, "orthogonal" is not limited to being exactly orthogonal and includes being generally orthogonal within the scope in which the operation and advantages of the embodiment are obtained.

In this specification, "flat" includes a shape including a truncated corner or a truncated ridge, a shape including a rounded corner or a rounded ridge, and a shape the surface of which partially or entirely has irregularities. In this specification, "tubular" is not limited to a shape of a circumferential wall continuously and entirely extending in the circumferential direction and includes a tubular shape formed by combining different parts and a shape having a cutaway portion in the circumferential direction such as the shape of C. The "tubular" shape further includes a circle, an ellipse, and a polygon having a sharp corner or a round corner.

Structure of Connector Unit 10

Figure 2:
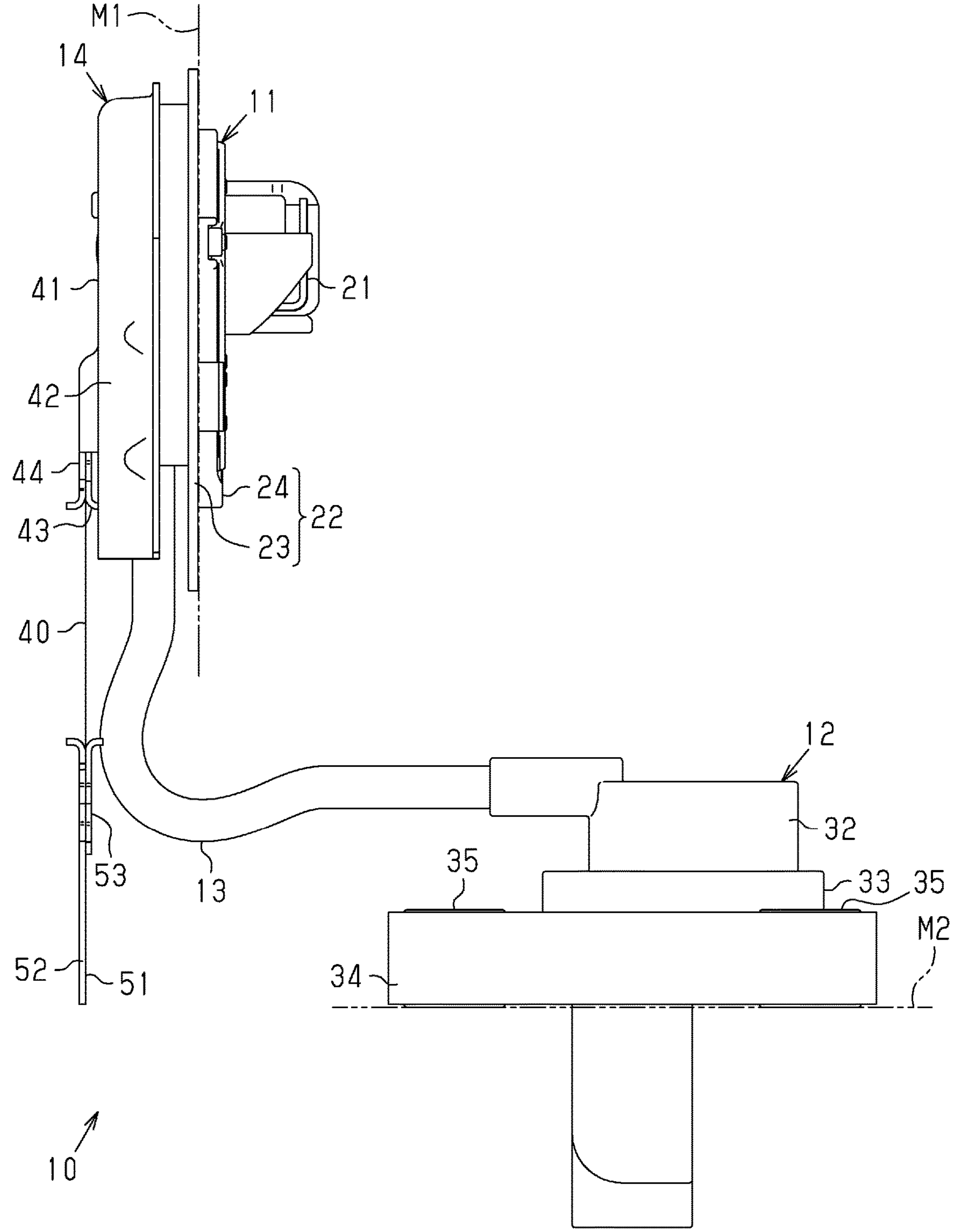
FIG. 2 is a side view showing the connector unit of the embodiment.

As shown in FIGS. 1 and 2, the present embodiment of a connector unit 10 includes a first connector 11, a second connector 12, electric wires 13 electrically connecting the first connector 11 and the second connector 12, and a shield unit 14.

As shown in FIG. 1, the first connector 11 includes a plurality of first terminals 21. The second connector 12 includes a plurality of second terminals 31. One end of each electric wire 13 is connected to one of the first terminals 21. The other end of the electric wire 13 is connected to one of the second terminals 31. The first connector 11 and the second connector 12 are, for example, high voltage connectors.

As shown in FIG. 2, the first connector 11 is coupled to a first on-board device M1. The first on-board device M1 is, for example, an inverter. The first terminals 21 are connected to respective terminals arranged on the first on-board device M1, which are not shown in the drawings. The second connector 12 is coupled to a second on-board device M2. The second on-board device M2 is, for example, a driving motor for an electric vehicle or a hybrid vehicle to travel. The second terminals 31, which are shown in FIG. 1, are connected to terminals arranged on the second on-board device M2, which are not shown in the drawings.

Structure of First Connector 11

The first connector 11 includes the first terminals 21 and a first holder 22 that holds the first terminals 21.

As shown in FIGS. 1 and 2, the first holder 22 includes, for example, a metal base member 23 and a resin member 24 integrated with the base member 23. In an example, a metal plate is pressed to form the base member 23. In an example, the base member 23 is fixed to an outer side surface of a casing of the first on-board device M1 by bolts, which are not shown in the drawings. The casing of the first on-board device M1 is formed of a conductor. The casing of the first on-board device M1 is grounded.

The resin member 24 is formed through insert molding in which the first terminals 21 are inserts. The first terminals 21 are embedded in the resin member 24 so that each first terminal 21 is partially disposed inside the resin member 24. The electric wires 13 are connected to the first terminals 21 inside the resin member 24.

As shown in FIG. 1, the resin member 24 includes an opening 25. The first terminals 21 may be visually recognized at an inner side of the opening 25. The task of connecting the first terminals 21 to the terminals of the first on-board device M1 is performed through the opening 25.

Structure of Second Connector 12

The second connector 12 includes a plurality of second terminals 31, a second holder 32 that holds the second terminals 31, and a terminal mount 33.

As shown in FIGS. 1 and 2, the second holder 32 is formed from, for example, a synthetic resin. The second holder 32 is formed through insert molding in which the second terminals 31 are inserts. The electric wires 13 are connected to the second terminals 31 inside the second holder 32. The second holder 32 is coupled to the terminal mount 33.

In an example, the terminal mount 33 is fixed to an outer side surface of a casing of the second on-board device M2 by bolts, which are not shown in the drawings. The casing of the second on-board device M2 is formed of a conductor. The casing of the second on-board device M2 is grounded.

The terminal mount 33 is, for example, mainly formed from a synthetic resin. Specifically, the terminal mount 33 includes a mount body 34 formed from a synthetic resin. Tubular collars 35 are embedded in the mount body 34 so that fixing bolts, not shown in the drawings, are inserted through the collars 35. The portion of the mount body 34 excluding the collars 35 is formed of a synthetic resin. The collars 35 are formed of a material having a higher rigidity than the synthetic resin forming the main portion of the mount body 34. An example of such a material is a metal.

The terminal mount 33 holds a plurality of terminals, which are not shown in the drawings. One end of each terminal of the terminal mount 33 is connected to one of the second terminals 31. The other end of the terminal of the terminal mount 33 is connected to a terminal arranged on the second on-board device M2, which is not shown in the drawings.

Structure of Shield Unit 14

The shield unit 14 includes an electromagnetic shield member 40, an electromagnetic shield cover 41 fixed to one end of the electromagnetic shield member 40, and a bracket 51 fixed to the other end of the electromagnetic shield member 40. Each of the electromagnetic shield cover 41 and the bracket 51 is formed of a conductor. The electromagnetic shield cover 41 is integrated with the first connector 11. The bracket 51 is separated from the second connector 12 and is non-integrated with the second connector 12. In an example, the bracket 51 is grounded by the casing of the second on-board device M2. The description "the bracket 51 is non-integrated with the second connector 12" means that the bracket 51 is not fixed to any component of the second connector 12. More specifically, the structure in which the bracket 51 is non-integrated with the second connector 12 includes a structure in which each of the second connector 12 and the bracket 51 is fixed to the casing of the second on-board device M2.

Structure of Electromagnetic Shield Member 40

The electromagnetic shield member 40 includes a sheet of a conductor. The electromagnetic shield member 40 is flexible. The electromagnetic shield member 40 is, for example, a braided sheet obtained by braiding a plurality of strands formed of a conductor. The material of the strands forming the electromagnetic shield member 40 may be a metal material, for example, a copper-based material or an aluminum-based material. The electromagnetic shield member 40 is, for example, a rectangular sheet.

At least part of the electromagnetic shield member 40 is disposed at a side of the electric wires 13. The electromagnetic shield member 40 covers only one side of the electric wires 13 in a direction orthogonal to a direction in which the electric wires 13 are arranged. In other words, the side of the electric wires 13 opposite from where the electromagnetic shield member 40 is disposed is not covered by the electromagnetic shield member.

One end of the electromagnetic shield member 40 is fixed to the electromagnetic shield cover 41, which is fixed to the first connector 11. In other words, the electromagnetic shield member 40 is integrated with the first connector 11 by the electromagnetic shield cover 41.

Structure of Electromagnetic Shield Cover 41

Figure 3:
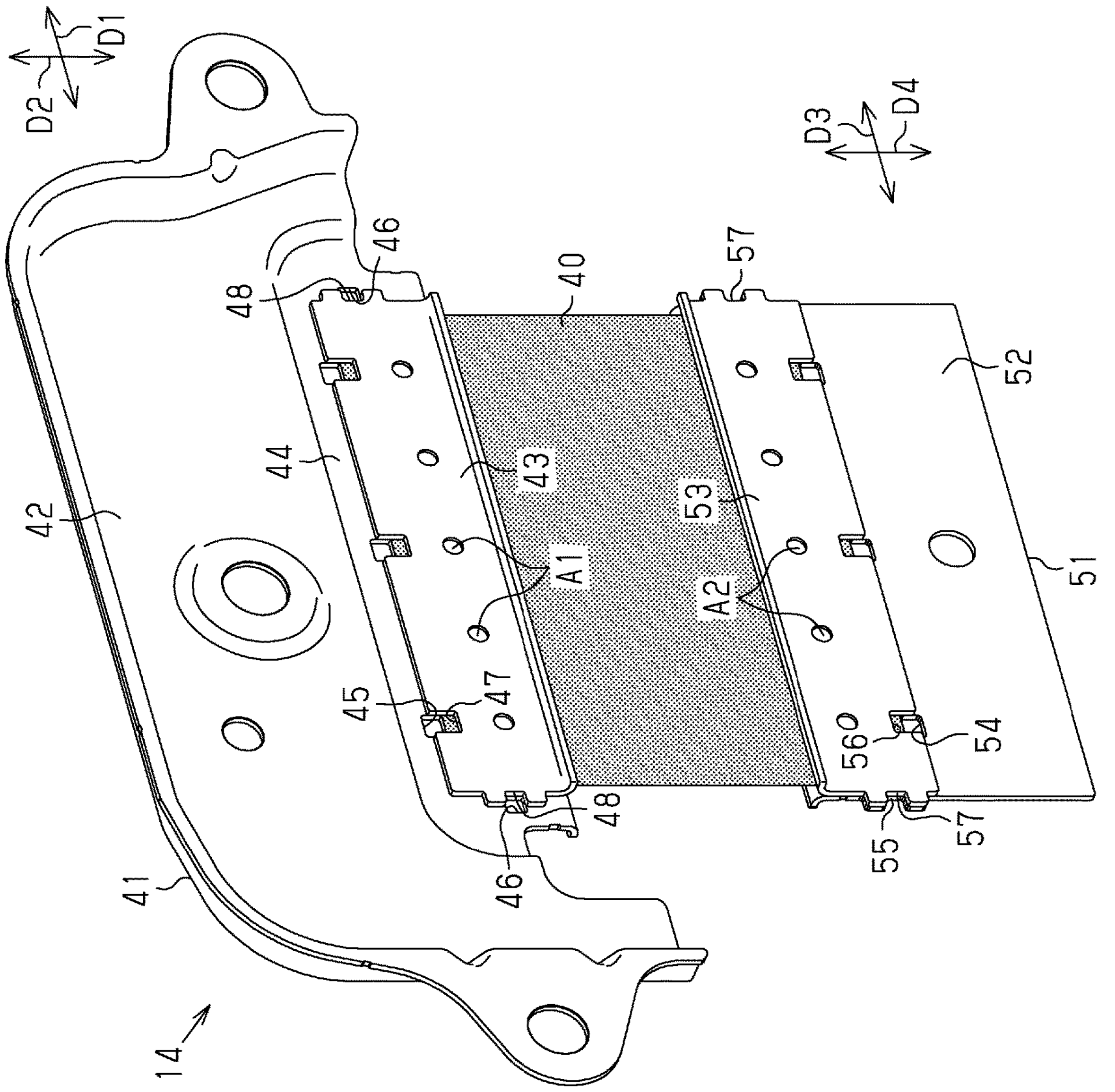
FIG. 3 is a perspective view showing a shield unit of the embodiment.
Figure 4:
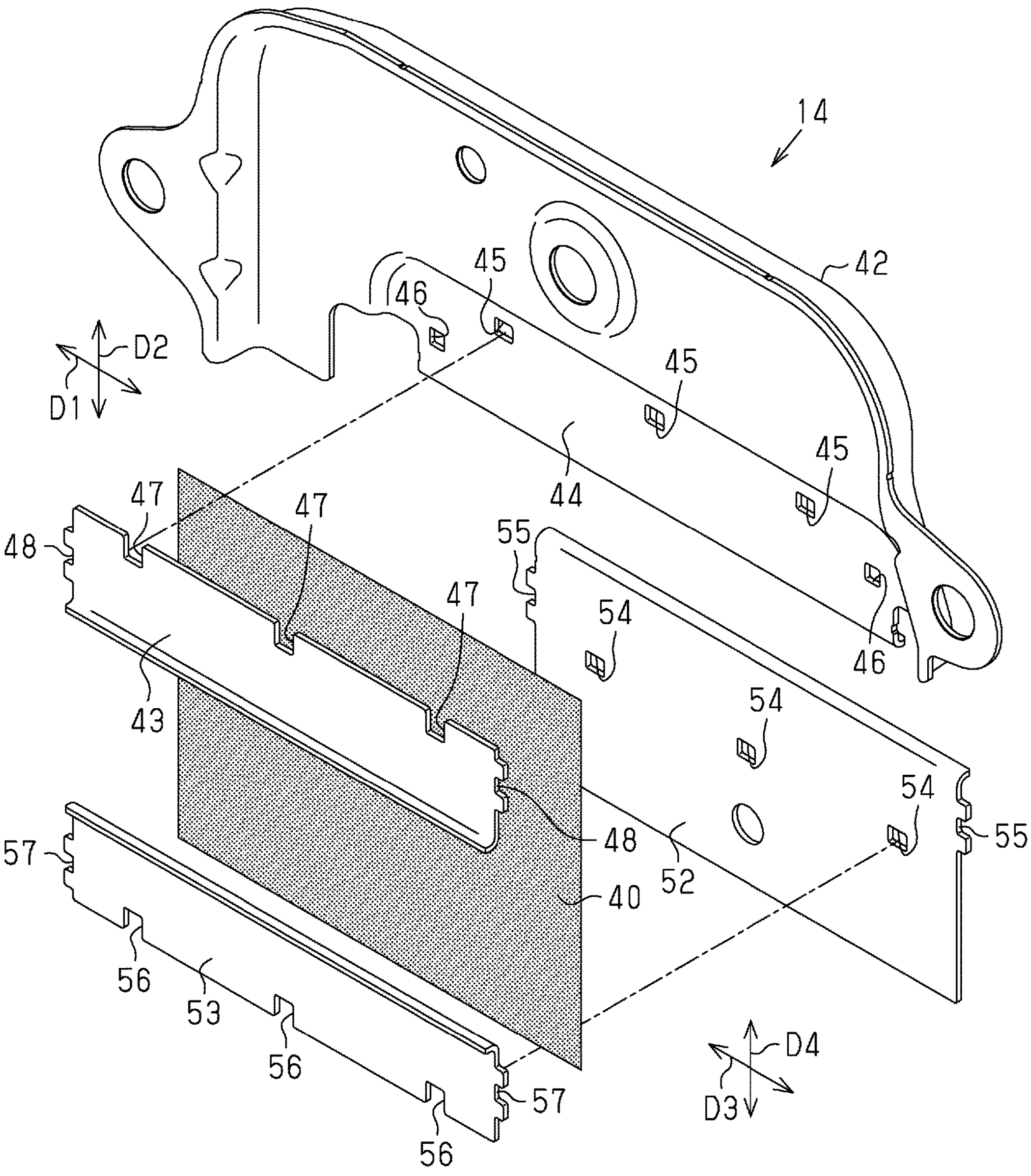
FIG. 4 is an exploded perspective view showing the shield unit of the embodiment.

As shown in FIGS. 3 and 4, the electromagnetic shield cover 41 includes a cover body 42 and a first fixing plate 43. The cover body 42 covers the first connector 11. The cover body 42 is plate-shaped. In an example, a metal plate is pressed to form the cover body 42.

The cover body 42 is fixed to the first holder 22. In an example, the cover body 42 is fixed to the base member 23 by bolts, which are not shown in the drawings. The cover body 42 covers a side surface of the first holder 22 opposite from the side facing the first on-board device M1. The cover body 42 covers at least the opening 25 of the resin member 24 in the first holder 22.

The cover body 42 includes a fixing portion 44 to which one end of the electromagnetic shield member 40 is fixed. The fixing portion 44 is substantially flat. The first fixing plate 43 is fixed to the fixing portion 44.

The first fixing plate 43 is substantially flat. The first fixing plate 43 is formed of, for example, a metal plate. The first fixing plate 43 is rectangular as viewed in a thickness-wise direction of the first fixing plate 43.

The fixing portion 44 and the first fixing plate 43 overlap each other in the thickness-wise direction. An end of the electromagnetic shield member 40 is fixed by being sandwiched between the fixing portion 44 and the first fixing plate 43. The first fixing plate 43 is opposed, in the thickness-wise direction, to a portion of the first holder 22 that incorporates the parts connecting the first terminals 21 and the electric wires 13.

Figure 5:
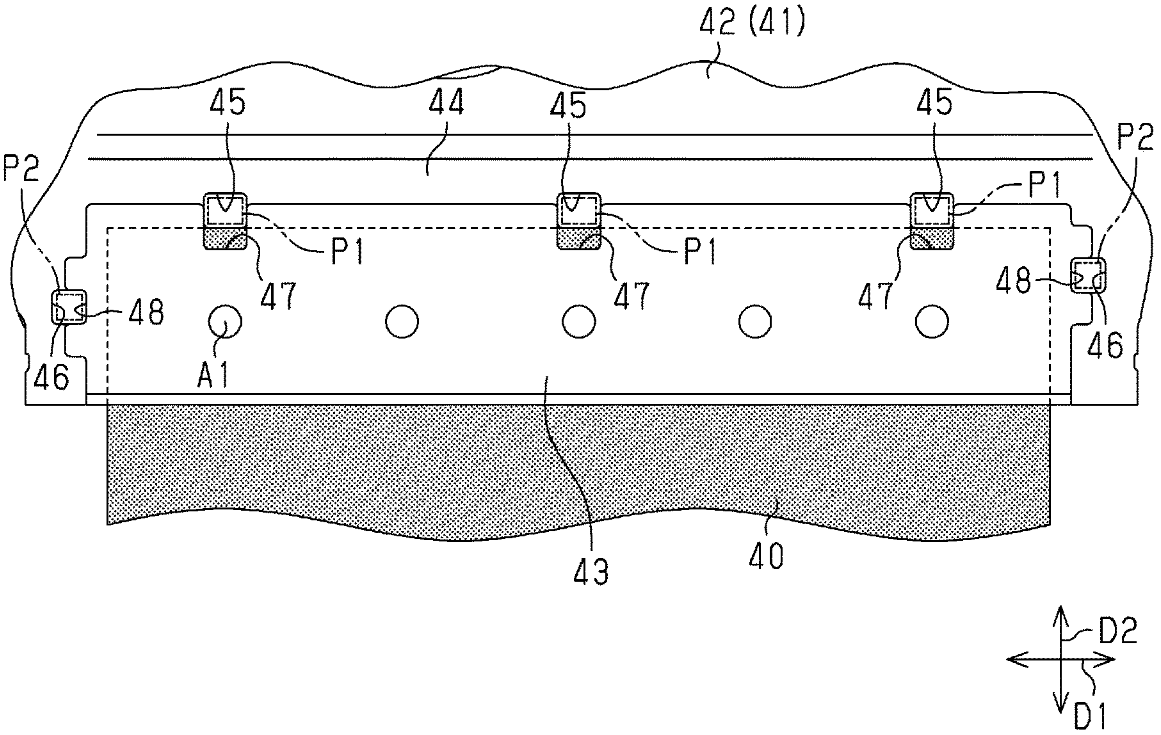
FIG. 5 is an enlarged front view showing part of the shield unit of the embodiment near an electromagnetic shield cover.

As shown in FIGS. 4 and 5, the cover body 42 includes a first positioning hole 45 extending through the fixing portion 44 in the thickness-wise direction. The first positioning hole 45 is, for example, rectangular as viewed in the thickness-wise direction of the fixing portion 44. In an example, first positioning holes 45 are arranged next to each other in a first direction D1 orthogonal to the thickness-wise direction of the fixing portion 44. In an example, the first positioning holes 45 are arranged along one of the long sides of the rectangular first fixing plate 43. In the description hereafter, a second direction D2 refers to a direction that is orthogonal to the thickness-wise direction of the fixing portion 44 and the first direction D1. In the present embodiment, the long sides of the first fixing plate 43 extend in the first direction D1, and the short sides of the first fixing plate 43 extend in the second direction D2.

The cover body 42 includes a second positioning hole 46 extending through the fixing portion 44 in the thickness-wise direction. The second positioning hole 46 is, for example, rectangular as viewed in the thickness-wise direction of the fixing portion 44. In an example, two second positioning holes 46 are arranged. In an example, the second positioning holes 46 are arranged at positions corresponding to opposite edges of the first fixing plate 43 in the first direction D1, that is, the two short sides of the first fixing plate 43.

As shown in FIG. 5, the first fixing plate 43 includes a first cutaway portion 47. The first cutaway portion 47 is disposed at one end of the first fixing plate 43 in the second direction D2. The first cutaway portion 47 is recessed from the end of the first fixing plate 43 in the second direction D2 as viewed in the thickness-wise direction of the first fixing plate 43. In an example, two or more first cutaway portions 47 are arranged next to each other in the first direction D1. In an example, the first cutaway portions 47 are identical in shape and size.

The first cutaway portions 47 respectively correspond to the first positioning holes 45. More specifically, when the first fixing plate 43 is fixed to the fixing portion 44, the first cutaway portions 47 and the first positioning holes 45 are located at the same position in the first direction D1. In addition, the first positioning holes 45 are equal in width to the first cutaway portions 47 in the first direction D1.

The first cutaway portions 47 are displaced from the first positioning holes 45 in the second direction D2. As viewed in the thickness-wise direction of the first fixing plate 43, part of the first positioning hole 45 and part of the electromagnetic shield member 40 are located in a region of the first cutaway portion 47. In an example, in the region of the first cutaway portion 47, part of the first positioning hole 45 and part of the electromagnetic shield member 40 are arranged next to each other in the second direction D2.

The first fixing plate 43 includes second cutaway portions 48. The second cutaway portions 48 are disposed at an end of the first fixing plate 43 in the first direction D1. The second cutaway portions 48 are recessed from the end of the first fixing plate 43 in the first direction D1 as viewed in the first fixing plate 43.

The second cutaway portions 48 overlap the second positioning holes 46 in the thickness-wise direction of the fixing portion 44 and the first fixing plate 43. The second cutaway portions 48 are equal in width to the second positioning holes 46 in the second direction D2. Thus, when coupling the electromagnetic shield cover 41 to the electromagnetic shield member 40, the second positioning holes 46 overlap the second cutaway portions 48. This positions the first fixing plate 43 with respect to the fixing portion 44 in the first direction D1 and the second direction D2.

The fixing portion 44 and the first fixing plate 43 are fixed to each other by, for example, swaging. In an example, when the electromagnetic shield member 40 is disposed between the fixing portion 44 and the first fixing plate 43, the fixing portion 44 and the first fixing plate 43 are fixed to each other by a punch, which is not shown in the drawings. Two or more locations pressed by the punch are set in the first direction D1. More specifically, the fixing portion 44 and the first fixing plate 43 include pressed marks A1 arranged in the first direction D1. The pressed mark A1 is a recess formed when pressed by the punch.

Structure of Bracket 51

As shown in FIGS. 3 and 4, the bracket 51 includes a bracket body 52 and a second fixing plate 53. The bracket body 52 is plate-shaped. In an example, a metal plate is pressed to form the bracket body 52.

The second fixing plate 53 is fixed to the bracket body 52. The second fixing plate 53 is substantially flat. The second fixing plate 53 is formed of, for example, a metal plate. The second fixing plate 53 is rectangular as viewed in the thickness-wise direction. In the present embodiment, the second fixing plate 53 and the first fixing plate 43 are identical in shape and size. That is, the first fixing plate 43 and the second fixing plate 53 are treated as identical components.

The bracket body 52 and the second fixing plate 53 overlap each other in the thickness-wise direction. An end of the electromagnetic shield member 40 is fixed by being sandwiched between the bracket body 52 and the second fixing plate 53.

Figure 6:
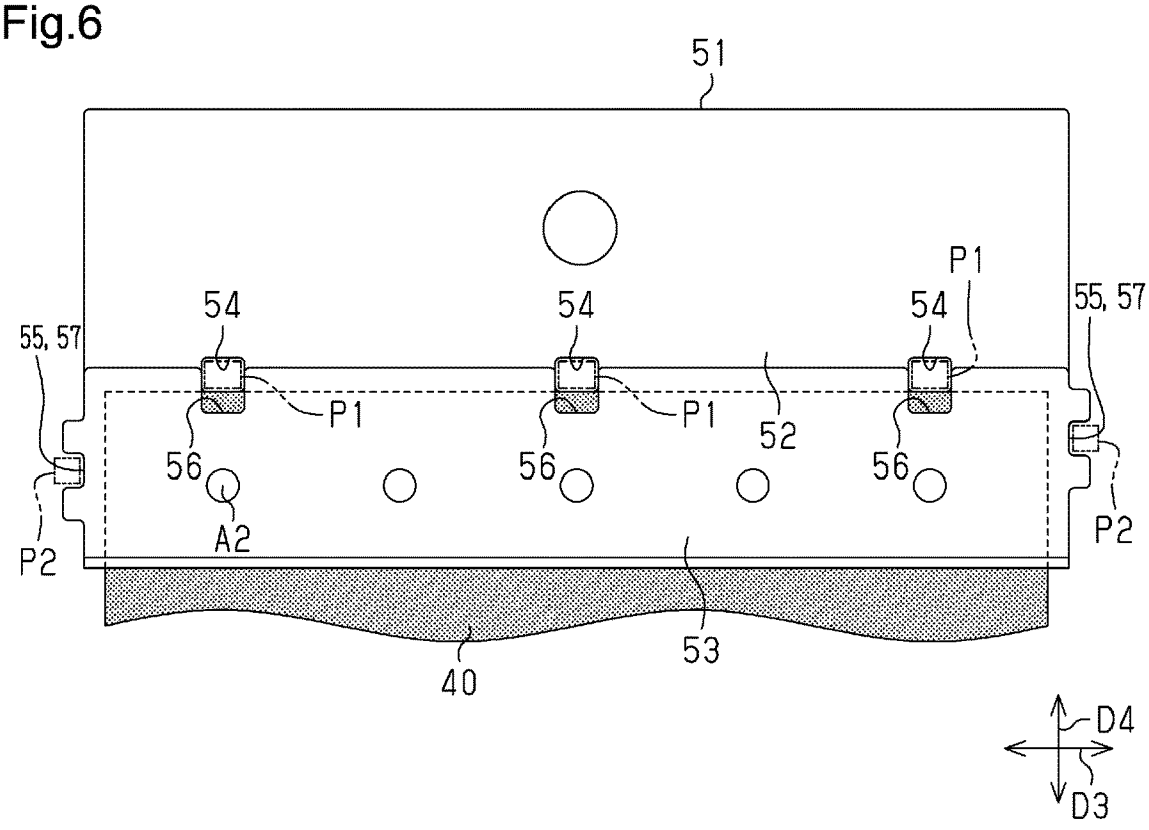
FIG. 6 is an enlarged front view showing part of the shield unit of the embodiment near a bracket.

As shown in FIGS. 4 and 6, the bracket body 52 includes a first positioning hole 54 extending through the bracket body 52 in the thickness-wise direction. The first positioning hole 54 is, for example, rectangular as viewed in the thickness-wise direction of the bracket body 52. In an example, two or more first positioning holes 54 are arranged next to each other in a first direction D3 orthogonal to the thickness-wise direction of the bracket body 52. In an example, the first positioning holes 54 are arranged along one of the long sides of the rectangular second fixing plate 53. In the description hereafter, a second direction D4 refers to a direction that is orthogonal to the thickness-wise direction of the bracket body 52 and the first direction D3. In the present embodiment, the long sides of the second fixing plate 53 extend in the first direction D3, and the short sides of the second fixing plate 53 extend in the second direction D4.

The bracket body 52 includes a positioning recess 55. The positioning recess 55 includes, for example, a cutaway portion. The positioning recess 55 is a cutaway portion that is recessed from the end of the bracket body 52 in the first direction D3 as viewed in the thickness-wise direction of the bracket body 52. In an example, two positioning recesses 55 are arranged. In an example, the positioning recesses 55 are arranged in opposite ends of the bracket body 52 in the first direction D3. In an example, the positioning recesses 55 are arranged at positions corresponding to opposite edges of the second fixing plate 53 in the first direction D3, that is, the two short sides of the second fixing plate 53.

As shown in FIG. 6, the second fixing plate 53 includes a first cutaway portion 56. The first cutaway portion 56 is disposed at an end of the second fixing plate 53 in the second direction D4. The first cutaway portion 56 is recessed from the end of the second fixing plate 53 in the second direction D4 as viewed in the thickness-wise direction of the second fixing plate 53. In an example, two or more first cutaway portions 56 are arranged next to each other in the first direction D3. In an example, the first cutaway portions 56 are identical in shape and size.

The first cutaway portions 56 respectively correspond to the first positioning holes 54. More specifically, when the second fixing plate 53 is fixed to the bracket body 52, the first cutaway portions 56 and the first positioning holes 54 are located at the same position in the first direction D3. The first positioning holes 54 are equal in width to the first cutaway portions 56 in the first direction D3.

The first cutaway portions 56 are displaced from the first positioning holes 54 in the second direction D4. As viewed in the thickness-wise direction of the second fixing plate 53, part of the first positioning hole 54 and part of the electromagnetic shield member 40 are located in a region of the first cutaway portion 56. In an example, in the region of the first cutaway portion 56, part of the first positioning hole 54 and part of the electromagnetic shield member 40 are arranged next to each other in the second direction D4.

The second fixing plate 53 includes second cutaway portions 57 disposed at an end of the second fixing plate 53 in the first direction D3. The second cutaway portions 57 are recessed from the end of the second fixing plate 53 in the first direction D3 as viewed in the thickness-wise direction of the second fixing plate 53.

The second cutaway portions 57 overlap the positioning recesses 55 in the thickness-wise direction of the bracket body 52 and the second fixing plate 53. The second cutaway portions 57 are equal in width to the positioning recesses 55 in the second direction D4. Thus, when coupling the bracket 51 to the electromagnetic shield member 40, the positioning recesses 55 overlap the second cutaway portions 57. This positions the second fixing plate 53 with respect to the bracket body 52 in the first direction D3 and the second direction D4.

The bracket body 52 and the second fixing plate 53 are fixed to each other by, for example, swaging. In an example, when the electromagnetic shield member 40 is disposed between the bracket body 52 and the second fixing plate 53, the bracket body 52 and the second fixing plate 53 are fixed to each other by a punch, which is not shown in the drawings. Two or more locations pressed by the punch are set in the first direction D3. More specifically, the bracket body 52 and the second fixing plate 53 include pressed marks A2 arranged in the first direction D3. The pressed mark A2 is a recess formed when pressed by the punch.

A process for fixing the electromagnetic shield member 40 to the electromagnetic shield cover 41 will now be described.

In an example, the fixing portion 44 of the cover body 42 is placed on a die of a swaging jig, which is not entirely shown in the drawings. At this time, as shown in FIG. 5, first positioning pins P1, which project from the die, are inserted through the respective first positioning holes 45 in the fixing portion 44. Also, second positioning pins P2, which project from the die, are inserted through the respective second positioning holes 46 in the fixing portion 44. This positions the fixing portion 44 with respect to the die in the first direction D1 and the second direction D2.

Then, an end of the electromagnetic shield member 40 is placed on the fixing portion 44 of the cover body 42, which is placed on the die. At this time, the edge of the electromagnetic shield member 40 in the second direction D2 abuts the first positioning pins P1, which project from the first positioning holes 45. This positions the end of the electromagnetic shield member 40 in the second direction D2.

The first fixing plate 43 is placed on the electromagnetic shield member 40, which is placed on the fixing portion 44. At this time, the second positioning pins P2 are inserted into the second cutaway portions 48 of the first fixing plate 43. Thus, the first fixing plate 43 is positioned with respect to the fixing portion 44 in the first direction D1 and the second direction D2.

Also, the first positioning pins P1 are inserted into the first cutaway portions 47 of the first fixing plate 43. Thus, the first fixing plate 43 is positioned with respect to the die and the fixing portion 44 in the first direction D1. In the second direction D2, the first positioning pin P1 is spaced apart from the edge of the first cutaway portion 47 by a gap. The edge of the electromagnetic shield member 40 can be visually recognized from the gap. Thus, when the electromagnetic shield member 40 is sandwiched between the fixing portion 44 and the first fixing plate 43, the position of the electromagnetic shield member 40 may be adjusted as the edge of the electromagnetic shield member 40 is seen through the first cutaway portions 47. After the positional adjustment of the electromagnetic shield member 40 is completed, the fixing portion 44 and the first fixing plate 43 are fixed with the electromagnetic shield member 40 by, for example, swaging.

A process for fixing the electromagnetic shield member 40 to the bracket 51 will now be described.

In an example, the bracket body 52 is placed on the die. At this time, as shown in FIG. 6, the first positioning pins P1 are inserted into the respective first positioning holes 54 of the bracket body 52. Also, the second positioning pins P2 are inserted into the respective positioning recesses 55 of the bracket body 52. This positions the bracket body 52 with respect to the die in the first direction D3 and the second direction D4.

Then, an end of the electromagnetic shield member 40 is placed on the bracket body 52, which is placed on the die. At this time, the edge of the electromagnetic shield member 40 in the second direction D4 abuts the first positioning pins P1, which project from the first positioning holes 54. This positions the end of the electromagnetic shield member 40 in the second direction D4.

The second fixing plate 53 is placed on the electromagnetic shield member 40, which is placed on the bracket body 52. At this time, the second positioning pins P2 are inserted into the second cutaway portions 57 of the second fixing plate 53. This positions the second fixing plate 53 with respect to the die and the bracket body 52 in the first direction D3 and the second direction D4.

Also, the first positioning pins P1 are inserted into the first cutaway portions 56 of the second fixing plate 53. This positions the second fixing plate 53 with respect to the die and the bracket body 52 in the first direction D3. In the second direction D4, the first positioning pin P1 is spaced apart from the edge of the first cutaway portions 56 by a gap. The edge of the electromagnetic shield member 40 can be visually recognized from the gap. Thus, when the electromagnetic shield member 40 is sandwiched between the bracket body 52 and the second fixing plate 53, the position of the electromagnetic shield member 40 may be adjusted as the edge of the electromagnetic shield member 40 is seen through the first cutaway portions 56. After the positional adjustment of the electromagnetic shield member 40 is completed, the bracket body 52 and the second fixing plate 53 are fixed with the electromagnetic shield member 40 by, for example, swaging.

The operation of the present embodiment will now be described.

The electromagnetic shield member 40 covers a side of the electric wires 13. The electromagnetic shield member 40 is grounded by the casing of the first on-board device M1 and the casing of the second on-board device M2. Thus, the electromagnetic shield member 40 limits, for example, irradiation of electromagnetic waves from the electric wires 13 to the outside.

The advantages of the present embodiment will now be described.

(1) In the electromagnetic shield cover 41, the first positioning holes 45 are equal in width to the first cutaway portions 47 in the first direction D1. As viewed in the thickness-wise direction of the first fixing plate 43, part of the first positioning hole 45 and part of the electromagnetic shield member 40 are located in the region of the first cutaway portion 47.

With this structure, when coupling the electromagnetic shield cover 41 to the electromagnetic shield member 40, the first positioning holes 45 overlap the first cutaway portions 47. This positions the first fixing plate 43 with respect to the fixing portion 44. When the electromagnetic shield member 40 is sandwiched between the fixing portion 44 and the first fixing plate 43, the first cutaway portions 47 allow for visual recognition that the edge of the electromagnetic shield member 40 is disposed near the end of the first fixing plate 43. Thus, as the electromagnetic shield member 40 is seen through the first cutaway portions 47, the position of the electromagnetic shield member 40 is adjusted. This facilitates the positional adjustment of the electromagnetic shield member 40. Accordingly, the efficiency of the task of fixing the electromagnetic shield cover 41 and the electromagnetic shield member 40 is improved.

In the bracket 51, the first positioning holes 54 are equal in width to the first cutaway portions 56 in the first direction D3. As viewed in the thickness-wise direction of the second fixing plate 53, part of the first positioning hole 54 and part of the electromagnetic shield member 40 are located in the region of the first cutaway portion 56.

With this structure, when coupling the bracket 51 to the electromagnetic shield member 40, the first positioning holes 54 overlap the first cutaway portions 56. This positions the second fixing plate 53 with respect to the bracket body 52. When the electromagnetic shield member 40 is sandwiched between the bracket body 52 and the second fixing plate 53, the first cutaway portions 56 allow for visual recognition that the edge of the electromagnetic shield member 40 is disposed near the end of the second fixing plate 53. Thus, as the electromagnetic shield member 40 is seen through the first cutaway portions 56, the position of the electromagnetic shield member 40 is adjusted. This facilitates the positional adjustment of the electromagnetic shield member 40. Accordingly, the efficiency of the task of fixing the bracket 51 and the electromagnetic shield member 40 is improved.

(2) In the electromagnetic shield cover 41, the first positioning holes 45 are arranged next to each other in the first direction D1, which is orthogonal to the thickness-wise direction of the fixing portion 44. The first cutaway portions 47 are arranged next to each other in the first direction D1 in correspondence with the first positioning holes 45. With this structure, when coupling the electromagnetic shield cover 41 to the electromagnetic shield member 40, the first positioning holes 45 of the fixing portion 44 overlap the first cutaway portions 47 of the first fixing plate 43. This further appropriately positions the first fixing plate 43 with respect to the fixing portion 44.

In the bracket 51, the first positioning holes 54 are arranged next to each other in the first direction D3, which is orthogonal to the thickness-wise direction of the bracket body 52. The first cutaway portions 56 are arranged next to each other in the first direction D3 in correspondence with the first positioning holes 54. With this structure, when coupling the bracket 51 to the electromagnetic shield member 40, the first positioning holes 54 of the bracket body 52 overlap the first cutaway portions 56 of the second fixing plate 53. This further appropriately positions the second fixing plate 53 with respect to the bracket body 52.

(3) The first fixing plate 43 includes the second cutaway portions 48 disposed at each end of the first fixing plate 43 in the first direction D1. The fixing portion 44 includes the second positioning holes 46 that overlap the second cutaway portions 48 in the thickness-wise direction. The second cutaway portions 48 are equal in width to the second positioning holes 46 in the second direction D2, which is orthogonal to the thickness-wise direction of the fixing portion 44 and the first direction D1. With this structure, when coupling the electromagnetic shield cover 41 to the electromagnetic shield member 40, the second positioning holes 46 of the fixing portion 44 overlap the second cutaway portions 48 of the first fixing plate 43. This positions the first fixing plate 43 with respect to the fixing portion 44 in the first direction D1 and the second direction D2.

The second fixing plate 53 includes the second cutaway portions 57 disposed at each end of the second fixing plate 53 in the first direction D3. The bracket body 52 includes the positioning recesses 55 that overlap the second cutaway portions 57 in the thickness-wise direction. The second cutaway portions 57 are equal in width to the positioning recesses 55 in the second direction D4, which is orthogonal to the thickness-wise direction of the bracket body 52 and the first direction D3. With this structure, when coupling the bracket 51 to the electromagnetic shield member 40, the positioning recesses 55 of the bracket body 52 overlap the second cutaway portions 57 of the second fixing plate 53. This positions the second fixing plate 53 with respect to the bracket body 52 in the first direction D3 and the second direction D4.

(4) The connector unit 10 includes the first connector 11 and the second connector 12. The electric wires 13 electrically connect the first connector 11 and the second connector 12. The electromagnetic shield cover 41, which corresponds to a fixing member, is fixed to one end of the electromagnetic shield member 40. The bracket 51, which corresponds to a fixing member, is fixed to the other end of the electromagnetic shield member 40. Each of the electromagnetic shield cover 41 and the bracket 51 is formed of a conductor. The electromagnetic shield cover 41 is fixed to the first connector 11 in a manner covering the first connector 11. The bracket 51 is separated from the second connector 12 and is non-integrated with the second connector 12. In an example, the bracket 51 is grounded by the casing of the second on-board device M2.

With this structure, in the electromagnetic shield cover 41, one end of the electromagnetic shield member 40 is sandwiched and fixed between the cover body 42 and the first fixing plate 43. This allows the electromagnetic shield member 40 to be fixed to the electromagnetic shield cover 41 without forming an opening in the electromagnetic shield cover 41. In addition, the bracket 51, which is fixed to the other end of the electromagnetic shield member 40, is separated from the second connector 12. This allows the bracket 51 to be grounded by, for example, being coupled to the casing of the second on-board device M2.

(5) The first fixing plate 43 of the electromagnetic shield cover 41 is identical in shape to the second fixing plate 53 of the bracket 51. In this structure, the first fixing plate 43 and the second fixing plate 53 are identically-shaped components. This simplifies the handling of the components of the connector unit 10.

(6) The second connector 12 includes the second terminals 31, which are connected to the electric wires 13, the second holder 32, which holds the second terminals 31 and is formed from a synthetic resin, and the terminal mount 33, which is coupled to the second on-board device M2 and is formed from a synthetic resin. This structure reduces the weight of the connector unit 10 as compared to a structure in which the terminal mount 33 is formed from metal. In this structure, since the bracket 51 is separated from the second connector 12, the terminal mount 33 of the second connector 12 is not used for grounding the bracket 51. This eliminates the need for forming the terminal mount 33 of a conductor and thus increases the degree of freedom for selecting the material of the terminal mount 33.

(7) The electromagnetic shield member 40 covers only one side of the electric wires 13 in a direction orthogonal to a direction in which the electric wires 13 are arranged. This structure hinders increases in the number of the electromagnetic shield members 40 used in the connector unit 10.

The present embodiment may be modified as follows. The present embodiment and the following modified examples can be combined within a range where the combined modified examples remain technically consistent with each other.

The structure of the electromagnetic shield member 40 is not limited to the braided sheet described in the embodiment. Alternatively, the electromagnetic shield member 40 may be formed of, for example, a metal foil.

The material forming the terminal mount 33 is not limited to a synthetic resin and may be changed to, for example, a metal. In this case, the bracket 51 may be fixed to the terminal mount 33 so that the electromagnetic shield member 40 is grounded.

In the electromagnetic shield cover 41 of the embodiment, as viewed in the thickness-wise direction of the first fixing plate 43, part of the first positioning hole 45 is disposed in the region of the first cutaway portion 47. Alternatively, as viewed in the thickness-wise direction of the first fixing plate 43, the entirety of the first positioning hole 45 may be disposed in the region of the first cutaway portion 47.

In the bracket 51 of the embodiment, as viewed in the thickness-wise direction of the second fixing plate 53, part of the first positioning hole 54 is disposed in the region of the first cutaway portion 56. Alternatively, as viewed in the thickness-wise direction of the second fixing plate 53, the entirety of the first positioning hole 54 may be disposed in the region of the first cutaway portion 56.

In the embodiment, the fixing portion 44 includes the second positioning hole 46, which serves as a positioning portion overlapping the second cutaway portion 48. Alternatively, the positioning portion may include, for example, a cutaway portion formed at an end of the fixing portion 44 in the first direction D1.

In the embodiment, the bracket body 52 includes the positioning recess 55, which serves as a positioning portion overlapping the second cutaway portion 57. Alternatively, the positioning portion may include, for example, a through hole extending through the bracket body 52.

The first fixing plate 43 and the second fixing plate 53 may differ from each other in shape.

The number of the first positioning holes 45 and the number of the second positioning holes 46 in the fixing portion 44 are not limited to those described in the embodiment and may be changed in accordance with the structure of the electromagnetic shield cover 41. The number of the first cutaway portions 47 and the number of the second cutaway portions 48 in the first fixing plate 43 are not limited to those described above and may be changed in accordance with the structure of the electromagnetic shield cover 41.

The number of the first positioning holes 54 and the number of the positioning recesses 55 in the bracket body 52 are not limited to those described in the embodiment and may be changed in accordance with the structure of the bracket 51. The number of the first cutaway portions 56 and the number of the second cutaway portions 57 in the second fixing plate 53 are not limited to those described in the embodiment and may be changed in accordance with the structure of the bracket 51.

In the embodiment, each end of the electromagnetic shield member 40 is sandwiched and fixed between two separate members in each of the electromagnetic shield cover 41 and the bracket 51. Alternatively, the first fixing plate 43 or the second fixing plate 53 may be omitted from one of the electromagnetic shield cover 41 and the bracket 51, and part of the cover body 42 or part of the bracket body 52 may be bent and folded to form a bent fixing portion that sandwiches and fixes an end of the electromagnetic shield member 40.

In the electromagnetic shield cover 41 of the embodiment, the fixing portion 44 and the first fixing plate 43 are fixed to each other by being swaged with a punch. Alternatively, for example, the fixing portion 44 and the first fixing plate 43 may be fixed by welding such as ultrasonic welding.

In the bracket 51 of the embodiment, the bracket body 52 and the second fixing plate 53 are fixed to each other by being swaged with a punch. Alternatively, for example, the bracket body 52 and the second fixing plate 53 may be fixed by welding such as ultrasonic welding.

As shown in FIG. 4, the cover body 42 may be a member separated from the first fixing plate 43. The bracket body 52 may be a member separated from the second fixing plate 53. This structure facilitates the positional adjustment of the cover body 42 and the first fixing plate 43, the positional adjustment of the bracket body 52 and the second fixing plate 53, the positional adjustment of the electromagnetic shield member 40 sandwiched between the cover body 42 and the first fixing plate 43, and the positional adjustment of the electromagnetic shield member 40 sandwiched between the bracket body 52 and the second fixing plate 53.

As shown in FIGS. 3, 5, and 6, when the fixing plates 43 and 53 overlap the cover body 42 and the bracket body 52, and the positioning holes 45 and 54 of the cover body 42 and the bracket body 52 are entirely or partially located in the cutaway portions 47 and 56 of the fixing plates 43 and 53, the edge (e.g., lower edge in the second direction D2 in FIG. 5) of the positioning holes 45 and 54 may be spaced apart by a gap from the inner edge (e.g., furthermost edge in the second direction D2 in FIG. 5) of the cutaway portions 47 and 56. With this structure, when the electromagnetic shield member 40 is sandwiched between the cover body 42 and the bracket body 52 and the fixing plates 43 and 53, the position of the edge of the electromagnetic shield member 40 may be visually checked through the gap.

As shown in FIGS. 5 and 6, the positioning hole 45 may be defined by a first liner inner edge extending in the second direction D2, which is orthogonal to the thickness-wise direction of the cover body 42. The cutaway portion 47 may be defined by a second linear inner edge extending in the second direction D2, which is orthogonal to the thickness-wise direction of the fixing plate 43. The same applies to the positioning hole 54 in the bracket body 52 and the cutaway portion 56 in the fixing plate 53. When the fixing plates 43 and 53 overlap the cover body 42 and the bracket body 52, the second linear inner edges of the cutaway portions 47 and 56 are aligned with the first linear inner edges of the positioning holes 45 and 54.

As shown in FIG. 5, the positioning hole 45 may be defined by two opposing vertical edges, which are separated from each other by a first distance in the first direction D1, and two opposing horizontal edges, which are separated from each other by a second distance in the second direction D2. The cutaway portion 47 may include two opposing vertical edges separated from each other by a third distance that is equal to the first distance in the first direction D1. Alternatively, the positioning hole 45 may be defined by two opposing horizontal edges having a first length in the first direction D1 and two opposing vertical edges having a second length in the second direction D2. The cutaway portion 47 may include two opposing vertical edges having a third length that is greater than the second length in the second direction D2. The two vertical edges of the cutaway portion 47 may have an open end at an edge that may be a long side of the fixing plate 43. The cutaway portion 47 may be defined by a horizontal edge or a furthermost edge extending in the first direction D1. Each vertical edge of the cutaway portion 47 may extend from the open end to the horizontal edge. With this structure, the alignment of the fixing plate 43 with the cover body 42 in the first direction D1 may be determined by visually checking whether the two vertical edges of the cutaway portion 47 are aligned with or coincide with the two vertical edges of the positioning holes 45. The cutaway portion 47 that is longer than the positioning hole 45 in the second direction D2 is advantageous as a visual check window for visually checking the entirety of the positioning holes 45 and part of the electromagnetic shield member 40 including the edge of the electromagnetic shield member 40. The same applies to the positioning hole 54 in the bracket body 52 and the cutaway portion 56 in the fixing plate 53.

All aspects of the embodiments in the present disclosure should be considered to be illustrative and non-restrictive. The present disclosure is not limited to those exemplified and is shown by the scope of the claims. It is intended to include all modifications within the meaning and range equivalent to the scope of the claims.

REFERENCE SIGNS LIST

10) connector unit
11) first connector (connector)
12) second connector (connector)
13) electric wire
14) shield unit
21) first terminal
22) first holder
23) base member
24) resin member
25) opening
31) second terminal
32) second holder (holder)
33) terminal mount
34) mount body
35) collar
40) electromagnetic shield member
41) electromagnetic shield cover (fixing member)
42) cover body (first plate)
43) first fixing plate (second plate)
44) fixing portion
45) first positioning hole (positioning hole)
46) second positioning hole (positioning portion)
47) first cutaway portion (cutaway portion)
48) second cutaway portion
51) bracket (fixing member)
52) bracket body (first plate)
53) second fixing plate (second plate)
54) first positioning hole (positioning hole)
55) second positioning recess (positioning portion)
56) first cutaway portion (cutaway portion)
57) second cutaway portion
A1) pressed mark
A2) pressed mark
D1) first direction
D2) second direction
D3) first direction
D4) second direction
M1) first on-board device
M2) second on-board device
P1) first positioning pin
P2) second positioning pin

The invention claimed is:

1. A connector unit, comprising:
a connector;
electric wires extending from the connector;
an electromagnetic shield member disposed at a side of the electric wires and formed of a sheet of a conductor; and
a fixing member fixed to one end of the electromagnetic shield member, wherein
the fixing member includes a first plate and a second plate,
the first plate and the second plate overlap in a thickness-wise direction of the first plate and the second plate,
one end of the electromagnetic shield member is fixed by being sandwiched between the first plate and the second plate,
the first plate includes a positioning hole used for positioning,
the positioning hole extends through the first plate in the thickness-wise direction of the first plate,
the second plate includes a cutaway portion in an end of the second plate,
the positioning hole is equal in width to the cutaway portion,
as viewed in the thickness-wise direction of the second plate, entirety or part of the positioning hole and part of the electromagnetic shield member are located in a region of the cutaway portion.

2. The connector unit according to claim 1, wherein
the positioning hole is one of a plurality of positioning holes arranged next to each other in a first direction that is orthogonal to the thickness-wise direction of the first plate, and
the cutaway portion is one of a plurality of cutaway portions arranged next to each other in the first direction in correspondence with the positioning holes.

3. The connector unit according to claim 2, wherein
the cutaway portion is referred to as a first cutaway portion,
the second plate includes a second cutaway portion disposed in an end of the second plate in the first direction,
the first plate includes a positioning portion including a hole or a cutaway portion that overlaps the second cutaway portion in the thickness-wise direction, and
the second cutaway portion is equal in width to the positioning portion in a second direction that is orthogonal to the thickness-wise direction of the first plate and the first direction.

4. The connector unit according to claim 1, wherein
the connector includes a first connector and a second connector,
the electric wires electrically connect the first connector and the second connector,
the fixing member includes an electromagnetic shield cover that is fixed to one end of the electromagnetic shield member,
the fixing member includes a bracket that is fixed to the other end of the electromagnetic shield member,
the electromagnetic shield cover and the bracket are each formed of a conductor,
the electromagnetic shield cover is fixed to the first connector in a manner covering the first connector, and
the bracket is separated from the second connector and non-integrated with the second connector.

5. The connector unit according to claim 4, wherein the second plate of the electromagnetic shield cover and the second plate of the bracket are identical in shape.

6. The connector unit according to claim 4, wherein the second connector includes terminals connected to the electric wires, a holder that holds the terminals and is formed from a synthetic resin, and a terminal mount coupled to an on-board device and is formed of a synthetic resin.

* * * * *